(12) United States Patent
Pace

(10) Patent No.: US 7,622,155 B1
(45) Date of Patent: Nov. 24, 2009

(54) SYSTEM AND METHOD FOR DECORATING VERTICAL CONCRETE SURFACE

(76) Inventor: Stanton R. Pace, 25887 Highway 102, Tecumseh, OK (US) 74873

( * ) Notice: Subject to any disclaimer, the term of this patent is extended or adjusted under 35 U.S.C. 154(b) by 691 days.

(21) Appl. No.: 10/981,886

(22) Filed: Nov. 5, 2004

Related U.S. Application Data

(60) Provisional application No. 60/520,153, filed on Nov. 14, 2003.

(51) Int. Cl.
*B05D 1/36* (2006.01)
(52) U.S. Cl. ....................... 427/356; 427/403
(58) Field of Classification Search ........................ None
See application file for complete search history.

(56) References Cited

U.S. PATENT DOCUMENTS 5,447,752 A * 9/1995 Cobb ......................... 427/270
5,873,936 A * 2/1999 Ogden ........................ 106/715
6,569,923 B1 * 5/2003 Slagter ........................... 524/5
6,572,697 B2 * 6/2003 Gleeson et al. ............. 106/705
6,652,907 B1   11/2003 Stever ........................ 427/154

* cited by examiner

*Primary Examiner*—Frederick J Parker
(74) *Attorney, Agent, or Firm*—Martin G. Ozinga; Phillips Murrah PC

(57) ABSTRACT

A method for decorating vertical surfaces which includes applying a bond coat of a primer made from concentrated liquid polymer to the vertical surface; allowing the bond coat to become tacky; applying a medium of cement, a light weight aggregate, silica sand, fused silica, monofilament denier fiber, liquid polymer resin, and water to the bond coat on the vertical surface; allowing the medium to set forming a scratch coat; applying a liquid release agent to the scratch coat; applying the medium over the liquid release agent; and decorating the medium on the vertical surface.

5 Claims, 3 Drawing Sheets

SYSTEM AND METHOD FOR DECORATING VERTICAL CONCRETE SURFACE

CROSS-REFERENCE TO RELATED APPLICATIONS

Priority is claimed from provisional application U.S. Ser. No. 60/520,153 filed on Nov. 14, 2003, and incorporated by reference herein.

BACKGROUND OF THE INVENTION

1. Field of the Invention

In general, the present invention relates to decorative shaping of generally vertical surfaces. More particularly, the present invention relates to a new and improved system and method for decorating concrete surfaces by generally applying a concrete medium to a vertical surface, producing a texture on the medium, and forming or cutting patterns on the textured medium. It is understood that the invention is neither limited to vertical surfaces nor use of concrete base as a deformable decorative medium. Likewise, the invention may include new and improved compositions such as but not limited to a decorative medium as well as apparatus such as but not limited to a template.

2. Description of the Prior Art

Concrete has been and continues to grow in versatility as not only a man made surface, but also as a canvas or template for decorations. It is now common that typically concrete surfaces such as driveways, sidewalks, and floors utilize decorative features that may simulate laid naturally found objects like stones and tiles as well as man made objects like bricks. It is also known to add dimensional characteristics such as grout lines, texturing, shapes, designs and so forth.

There are many advantages to altering the appearance of concrete to simulate other material. Generally, the material being simulated is more costly. Thus, by using a surface shaping stamp on concrete, the look of another material is achieved at a much lower cost. Also, concrete creates a very durable and stable surface that can be easily maintained. Other advantages to the use of concrete over other materials will be apparent to one of skill in the art.

Hence, it is known to decorate a poured horizontal concrete surface that may have the same or near same visual features as inlaid stones, brick or cobblestone to name a very few decorations. And whereas it is known to do such, what is not common is to create the same type of decorations on vertical surfaces such as walls, fences, pillars and the like. It is often if not always a different function to decorate a generally horizontal surface where weight may be generally and uniformly supported as opposed to a surface that is generally vertical in nature wherein the weight of the added medium may create technical issues for stability, durability, and decorative options.

Because of the limitations of the prior art mediums, there is currently a need for an improved deformable material and method for using in the decorating industry. In particular, there is a need for an improved material and method of using that is lighter weight, durable, and easily decorated for use with generally vertical surfaces.

Tools for forming decorative patterns in concrete are widely used in the industry. Most commonly, surface shaping tools are used for aesthetic purposes. In the known art, several apparatus and methods are used to create decorative features on the desired surface. These tools may be elaborate and intricate design stamps made from resin or simple hand tools used to carve lines and features in the surface. They can be used to shape concrete surfaces to imitate the appearance of other materials such as cobblestone, brick, slate, stone, tile or wood. Surface shaping tools can also be used to form customized designs or to imprint a trademark or insignia. A variety of concrete surfaces can be altered with surface shaping tools, including sidewalks, driveways, patios, walls, and interior floors.

The prior art of concrete surface shaping tools can be divided into two general groups. The first includes tools that are used to create repeating and uniform patterns.

The second group includes tools that are used to create non-repeating patterns. One problem with using tools of the type that form repeating patterns is that they must be placed in an exact fashion and alignment to avoid overlapping an adjacent tool or imprint. Creating adequate alignment requires skill, training and additional tools. A second problem with tools of the repeating pattern type, such as preformed resin stamps, is that they frequently need cleaning due to the adherence or sticking of medium to the stamp.

Because of the limitations of the prior art devices, there is currently a need for an improved tool and method for forming designs in the surface of a deformable material. In particular, there is a need for an improved tool and method for forming customized designs and decorative surfaces in concrete of varying size and shape in an easy-to-use and inexpensive way. Still furthermore, there is a need for a tool that may provide the flexibility or option to combine repeating uniform patterns with a mixture of generally non-repeating patterns.

Of note, the invention is not necessarily directed strictly to concrete applications and the used terminology should not be considered limiting. Likewise, the current invention is not limited to vertical wall type surfaces known in the art. It is further understood and contemplated that the current invention may be used in association with items such as but not limited to forming other shapes on generally non-flat surfaces such as but not limited to man made or naturally occurring boulders.

The current industry is constantly looking for effective, durable, and uniquely decorated surfaces systems and methods for implementation of same. Thus, there is a need for a new and improved composition, apparatus, system, and method of use as outlined. The current invention provides an inexpensive vertical decoration and time saving device, method for making, and system where the prior art fails.

SUMMARY OF THE INVENTION

In view of the foregoing disadvantages inherent in the known types of decorative concrete systems of use and methods of making now present in the prior art, the present invention provides a convenient, easily used, and durable decorating system. As such, the general purpose of the present invention, which will be described subsequently in greater detail, is to provide a new and improved system and method for decorating vertical surfaces with a generally concrete medium which has all the advantages of the prior art and none of the disadvantages.

To attain such, the invention may include a new and improved template that may act as a "cookie" cutter, stamp, form, or die that may create naturally or unnaturally occurring patterns, imprint, designs, images, or demarcations in or on a prepared surface for decorative enhancements. In a preferred embodiment, the cutter is made from metal and generally shaped to create non-recurring or recurring and fairly random patterns that may simulate tile, stacked brick, stone, and so forth by creating demarcations such as grout line decorations.

Further the invention may include the method and/or system of preparing a surface to be decorated. As such, a medium is prepared that may include a preferred embodiment using a formulation of a lightweight concrete base generally comprising cement, coated crushed mica, silica sand, silica flour, fiber and so forth. The invention may still be considered to include a new and improved medium for vertical decorative surfaces also.

In another preferred embodiment, the present invention essentially comprises a new and improved method of creating a decorative vertical surface by generally preparing a medium, applying said medium to a surface, texturing the medium, then creating demarcations such as but not limited to grout lines.

Still furthermore, in a preferred embodiment of the invention, a system generally comprising the aforementioned is contemplated. It is understood that the system may encompass all the aforementioned, some of the aforementioned, or combinations thereof.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved system and method for decorating vertical concrete surfaces.

It is a further object of the present invention to provide a new and improved system and method for decorating vertical concrete surfaces which is of a durable and reliable construction and may be easily and efficiently applied, manufactured, and marketed.

An even further object of the present invention is to provide a new and improved system and method for decorating vertical concrete surfaces which is susceptible to a low cost of application with regard to both materials and labor, and which accordingly is then susceptible to low prices of sale to the consuming industry, thereby making such invention economically available to those in the industry.

Still another object of the present invention is to provide a new and improved system and method for decorating vertical concrete surfaces which provides all of the advantages of the prior art, while simultaneously overcoming some of the disadvantages normally associated therewith.

While still another object of the present invention is to provide a new and improved system and method for decorating vertical concrete surfaces which allows for a unique and generally non recurring pattern in a surface.

It is a further object of the present invention is to provide a new and improved system and method for decorating vertical concrete surfaces which may provides a lighter weight medium which may be applied to indoor and outdoor surfaces such as but not limited to wood, tile, slate, wallboard, brick, stucco and other commonly and uncommonly found vertical surfaces.

Furthermore, it is a further object of the present invention is to provide a new and improved lighter weight concrete based medium that may be used to form generally flat structures and surfaces and also to non flat dimensional objects and surfaces.

Still furthermore, it is a further object of the present invention is to provide a new and improved template, form, die, cutter, or stamp that may be utilized to create decorative surface features such as grout lines, demarcations, edging, shapes, forms and so forth.

Yet another object of the present invention is to provide a new and improved system and method for decorating surfaces which may be non vertical surfaces and non flat surfaces such as but not limited to artificial boulders, trees, landmarks, fences, pillars, and so forth.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

The present invention referred to throughout may be embodied in other specific forms without departing from its spirit or essential characteristics. The described embodiments are to be considered in all respects only as illustrative and not restrictive. Furthermore, each of the methods that have been described should also be considered only as illustrative and not restrictive. In particular, it should be appreciated that the present invention can be used to form various designs in various deformable materials.

BRIEF DESCRIPTION OF THE PICTORIAL ILLUSTRATIONS GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, drawings, exhibits and appendices wherein.

DETAILED DESCRIPTION OF THE PREFERRED EMBODIMENTS

Figure 1:
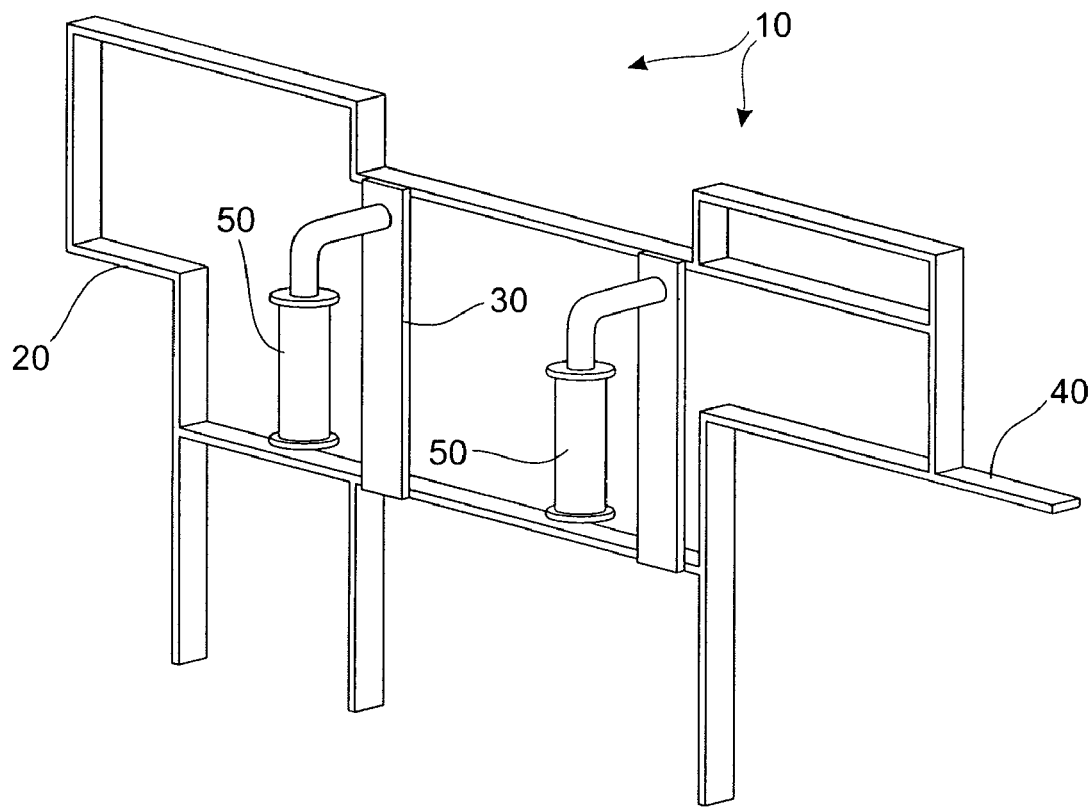
FIG. 1 is a perspective view of a preferred embodiment of the invention depicting a template or stamp.

Referring to the drawings and to FIG. 1 through FIG. 6 in particular, reference character 10 generally designates a tool, system, kit, medium and method of using the same. The current invention may be classified as a kit, tool, system, method, apparatus, composition and/or combinations thereof. The following detailed description does not define any aspect in a particular order of importance but rather attempts to organize the following for convenience only.

The material or medium is a custom, light-weight concrete material that can be applied up to three inches thick and stamped within minutes after it is laid on. This may achieve the deep texture normally associated with decorative flatwork—on fences, interior or exterior walls, pillars, etc. One element to the invention is the light weight nature of the material while another is the highly concentrated polymer. Laid on thick like plaster, the material or medium bonds to wall board, plaster, dry wall, paneling, brick, stone, existing concrete and so forth. Unless there are extreme defects in the surface, such as large holes or cracks, no additional reinforcement is necessary.

The material or medium may be applied using a hawk and trowel. Unlike regular concrete, troweling the surface may not be necessary. The medium is ready to stamp immediately after laying it. Touch-up and detail work may be performed the next day using carving tools.

Stamping, decorating, or creation of demarcations of vertical surfaces may call for special stamps, template and the like. In a preferred embodiment, smaller sized and additional tools for stamping single rows and corners may be utilized. This generally offers flexibility for stamping vertical surfaces as well as deeper texturing.

Template

Referring again to the drawings, wherein like numerals indicate like elements, in a preferred embodiment, invention 10 may include a, stamp, template, or tool 20. It is understood that the following should not be considered limiting to a particularly shaped embodiment. The present invention provides an improved tool 20 and method for forming customized designs and decorative demarcations in concrete surfaces of varying sizes and shapes in an easy-to-use and inexpensive way. The tool 20 is a stamp comprising a frame 30 having a smooth contact surface 40. It is preferable that the sides of the tool 20 comprise measurement markings that can also be used as a reference for placement. It is also preferable that the tool 20 have at least one handle 50 to facilitate placement and movement.

The shape of the frame 30 can vary, but it is preferred that the frame 30 have substantially right angles shapes so that the tool 20 can form designs in a surface having a somewhat irregular and regular appearance. One feature of invention 10 is that it allows a single tool 20 to form a design in a concrete surface by forming a single continuous recess consisting of multiple adjoining recesses within a regular or irregularly shaped area such as found in stacked or tiled materials.

An additional feature of the invention 10 is that it allows a variably selectable depth to be formed in a concrete surface having a regular or irregular shaped area. A further feature of the invention 10 is that it allows different patterns to be placed adjacently and interchangeably while forming a design pattern in a concrete surface having a regular or irregular shape.

Another feature of this invention is that it allows two adjoining stamps to be angularly offset within a range of angles to create a single continuous design imprint without overlapping or interfering with the design imprint formed by the alternate stamp. Yet another feature of this invention is that it allows a design to be formed in the surface of deformable materials other than concrete, such as asphalt and plasters. Tool 20 or template may be constructed from metal, plastic, wood or other materials generally durable materials in the art.

In a preferred construction, tool 20, generally pictured in FIG. 1, may be utilized. It is understood that this shape and configuration is for illustrative purposes and the invention is not limited to the same.

In accordance with an embodiment of the invention, a tool for creating designs in a vertical concrete surface may comprise an imprinting pattern means for creating non repeating, right angled, squares and rectangles; a frame attached to said imprinting pattern; and at least one handle attached to said frame. The frame may be made from metal, the imprinting pattern may be made from metal and at least one handle may be parallel to the frame.

Medium

In a preferred embodiment, the invention 10 may include a medium 60 formed from a compound or composition. It is understood that elements of the invention 10 may be used with known or conventional deformable materials or mediums.

An example of a preferred construction of an embodiment of medium 60 may generally include or comprise cement, a light weight aggregate, silica sand, fused silica or silica flour, and a monofilament fine denier fiber. It is further contemplated that the medium 60 may include a coloring material or generally use a colored cement such as a white or grey Portland cement. It is understood that other types and styles of cement may be used.

In a preferred construction a light weight aggregate may be included. The aggregate may be but is not limited to a crushed coated mica. It is contemplated that an aggregate sold under the trademark ZONALITE or ZONOLITE may be used. As described by the manufacturer, ZONOLITE is a free-flowing, drainable vermiculite insulation specially treated for water repellency and used to insulate masonry wall cores and cavities. It also increases the fire resistance rating and Sound Transmission Classification (STC) of the wall system. It is lightweight, non-toxic and non-flammable.

The medium 60 may also comprise silica sand such as but not limited to 40/140 silica sand. In the known field, the industrial silica sand market is broadly divided into three segments of ungrounded silica sands of lower purity and/or angular particle size, ungrounded high purity and/or high quality silica, −40+140 mesh, where uniform grain size and shape and chemical consistency are required, and ground silica, −200 to sub-micron size of high purity and quality. It is understood different styles, grades, shapes and colors may be utilized in a preferred embodiment.

In another preferred embodiment, silica flour or fused silica may be utilized such as but not limited to the product sold under the trademark RANCO-SIL or RANCOSIL. As described by the manufacturer, RANCO-SIL fused silica is electrically fused high purity silica. Fused silica has a low thermal conductivity and excellent thermal shock resistance. These properties, along with its low density, make it an excellent refractory for use in a ceramic shell mold. RANCO-SIL fused silica is available in both flour and granular forms. RANCO-SIL fused silica can be used throughout the ceramic shell. When used in the primary slurry it may be necessary to blend with zircon depending on the alloy. Shells constructed with fused silica hold their dimensions better and are not prone to hot deformation or bulging. Shell removal from casting, or knockout, is also easier with fused silica refractories.

Fused silica, $SiO_2$ is a noncrystalline (glass) form of silicon dioxide (quartz, sand), glasses, it lacks long range order in its atomic structure. Its highly cross link dimensional structure gives rise to its high use temperature and low thermal coefficient. The key properties are near zero thermal expansion, exceptionally good thermal shock resistance, very good chemical inertness, can be lapped and polished to fine finishes, low dielectric constant, low dielectric loss, and good UV transparency.

| TYPICAL CHEMICAL ANALYSIS OF RANCO-SIL FUSED SILICA | | | | |
|---|---|---|---|---|
| | Grains | | Flours | |
| | Min. | Max. | Min. | Max. |
| % $SiO_2$ | 99.7 | — | 99.7 | — |
| $Al_2O_3$ | — | 1000 ppm | — | 3000* ppm |
| $Fe_2O_3$ | — | 300 ppm | — | 350 ppm |
| CaO | — | 50 ppm | — | 50 ppm |
| MgO | — | 50 ppm | — | 50 ppm |
| $Na_2O$ | — | 50 ppm | — | 50 ppm |
| $K_2O$ | — | 50 ppm | — | 50 ppm |

| TYPICAL GRADES PHYSICAL AND CHEMICAL PROPERTIES OF SILICA SAND | | | |
|---|---|---|---|
| | Coarse | Medium | Fine |
| % Clay | 0.15 | 0.18 | 0.29 |
| % L.O.I. | 0.058 | 0.072 | 0.085 |
| pH | 7 | 7.1 | 7.4 |
| ADV | 0.5 | 0.8 | 1.7 |
| Grain Shape | Rounded | Rounded | Rounded |
| % $SiO_2$ | 99.75 | 99.65 | 99.51 |
| % $Al_2O_3$ | 0.055 | 0.065 | 0.12 |
| % $Fe_2O_3$ | 0.016 | 0.018 | 0.035 |
| % $TiO_2$ | 0.010 | 0.011 | 0.016 |
| CaO | 0.011 | 0.012 | 0.02 |
| MgO | 0.008 | 0.009 | 0.018 |

| CHEMICAL ANALYSIS OF SILICA FLOUR | |
|---|---|
| $SiO_2$ | 99.3-99.4% |
| $Al_2O_3$ | 0.2-0.3% |
| $TiO_2$ | 0.045% |
| $Fe_2O_3$ | 0.03-0.035% |
| $Cr_2O_3$ | 0.0004% |
| CaO | trace |
| MgO | trace |

| TECHNICAL DATA OF SILICA FLOUR | |
|---|---|
| Specific Gravity | 2.65 g/cm$^3$ |
| Hardness (Mohs) | 7 |
| Loss on Ignition | 0.17% |
| Brightness | 85-86% |
| Oil Absorption | 23 g/100 g |

Another preferred construction includes a fiber component such as but not limited to a monofilament. A preferred embodiment may include fiber manufactured from 100% virgin polypropylene. Furthermore, it may be a fine denier fiber of ½ inch, although it is contemplated that ¾ inch may be utilized. It is understood that other lengths greater, lesser, or in between the aforementioned may be contemplated. Still furthermore, it is also understood that other fiber known in the industry as well as different grades and composition may be utilized.

A preferred embodiment may include the following amounts and materials. It is understood that the following are amounts that generally comprise a total of 40 pounds and that the proportion and percentages may be used for other varying amounts of greater or lesser totals. Furthermore, the following examples should not be considered limiting and that amounts may be approximated, rounded off, or generally equivalent.

EXAMPLE 1

| | |
|---|---|
| Portland cement (grey) | 22.80 lbs. |
| Zonalite light weight aggregate | 2.29 lbs. |
| 40/140 Silica Sand | 8.57 lbs. |
| Rancosil silica flour or fused silica | 6.28 lbs. |
| ½" Fiber | 0.00357 lbs. |

EXAMPLE 2

| | |
|---|---|
| Portland cement (grey) | 25.20 lbs. |
| Zonalite light weight aggregate | 2.42 lbs. |
| 40/140 Silica Sand | 9.08 lbs. |
| Rancosil silica flour or fused silica | 3.332 lbs. |
| ½" Fiber | .00428 lbs. |

EXAMPLE 3

| | |
|---|---|
| Portland cement (white) | 22.80 lbs. |
| Zonalite light weight aggregate | 2.29 lbs. |
| 40/140 Silica Sand | 8.57 lbs. |
| Rancosil silica flour or fused silica | 6.28 lbs. |
| ½" Fiber | .00357 lbs. |

EXAMPLE 4

| | |
|---|---|
| Portland cement (white) | 25.20 lbs. |
| Zonalite light weight aggregate | 2.42 lbs. |
| 40/140 Silica Sand | 9.08 lbs. |
| Rancosil silica flour or fused silica | 3.332 lbs. |
| ½" Fiber | .00428 lbs. |

The above may generally be utilized with 1 to 2 gallons of a liquid solution with it being understood that the amount may be more or less. The liquid solution may be a mix of liquid concentrated liquid polymer resin and water with a general ration of 4 parts water to 1 part polymer. The liquid solution is then added to the above described and stirred, mixed or otherwise blended into a generally wet consistency of wet mortar. More liquid solution or dry ingredients may be added as necessary. A preferred embodiment is mixing, stirring or otherwise blending for an approximate time of 3 to 5 minutes where it is also contemplated that more or less time may be used.

A preferred embodiment includes use of a liquid polymer resin sold under the trademark STAMP STORE POLYMER which may also be used as a primer. It is understood that other known concentrated polymers or primers in a liquid or non-liquid form may be used. Furthermore, the concrete polymer may be the chemical family of acrylic/vinyl acetate with a boiling point above 212 degrees Fahrenheit, vapor density and evaporation rate relatively the same as water, and be of a 45% volatility by weight.

System and/or Method of Use

In a preferred embodiment, the surface 70 to be decorated and or covered may first be generally prepared by cleaning, removing debris and so forth. Pre-mixing of the medium 60 components may also be achieved as generally described above.

It is contemplated that a first step may be the addition of a bond coat of a primer such as but not limited to a concentrated liquid polymer is applied generally evenly to the surface and wherein the bond coat is allowed to generally become tacky. It is contemplated that the application may be utilized with known methods in the art such as but not limited to rolling. It is further contemplated that the polymer is non diluted but it is further contemplated that a diluted polymer may be utilized.

A scratch coat may then be utilized wherein a layer of the pre-prepared medium is applied. Using such tools but not limited thereto, a hawk and/or trowel is used to apply a thin coat to generally achieve an even coat. A preferred embodiment may be ⅛ of an inch thick but it is understood that more or less may be utilized. The coat is generally allowed to dry or set.

A liquid release agent may then be applied such as but not limited to the spraying of a liquid form of medium aliphatic solvent naphtha such as sold under the trademark BUBBLE-GUM sold by the STAMP STORE.

A preferred embodiment of the invention may then next include spreading the medium or material to a desired thickness. This may be accomplished by use of a hawk or trowel but is not limited thereto. Desired thickness may be approximately ½ inch or less or greater than depending on the desired decoration and depth of decoration. In a preferred method, decorating occurs before the material or becomes permanently set. It is further understood that after complete or near complete settings, alteration may be desired and accomplished by carving techniques known in the art.

Figure 2:
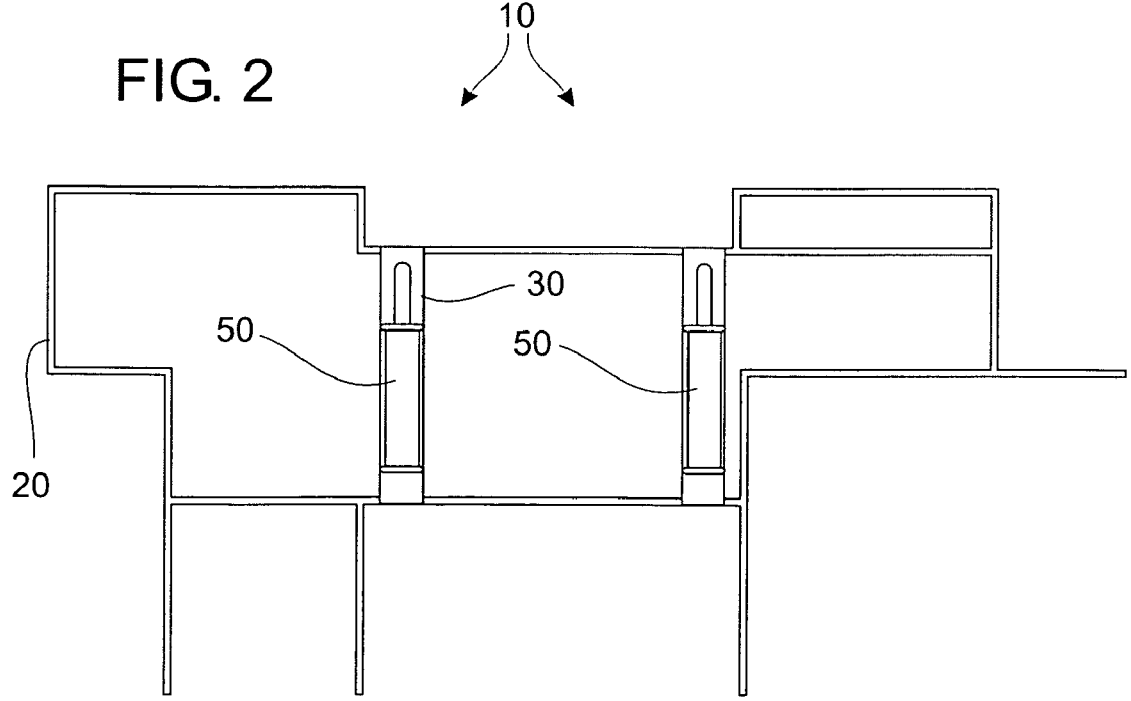
FIG. 2 is a top view of a preferred embodiment of the invention depicting a template or stamp.
Figure 3:
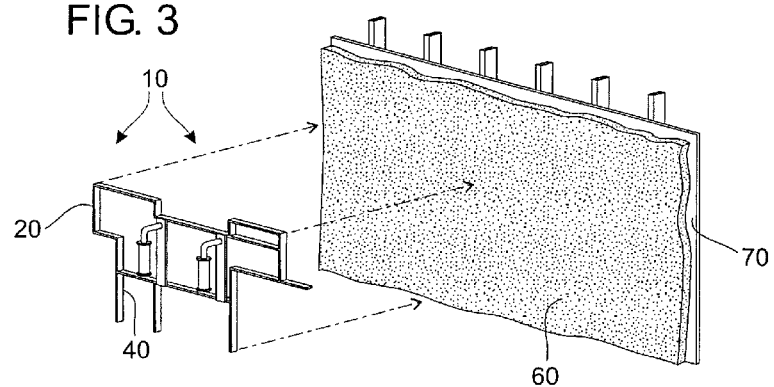
FIG. 3 is a general illustration of a preferred embodiment of the invention showing a vertical surface with medium applied and a template or stamp.
Figure 4:
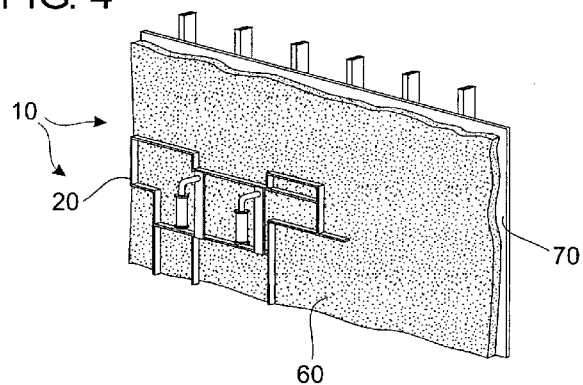
FIG. 4 is a general illustration of a preferred embodiment of the invention showing a template or stamp generally applied to a medium on a vertical surface.

In a preferred embodiment, template may be utilized to create demarcations such as those found in naturally laid or constructed walls, tiles, brickwork and so forth. While the medium is still generally deformable, the template is pressed into the medium at the desired level. The template may be over laid on existing imprints, decorations and so forth. The template may be rotated and oriented to at generally right angles to create non repeating patterns. It is contemplated that the template may need cleaning after an imprint into the medium of after several imprints as medium may gather on the impression surface of the template. An example of said invention is generally seen in FIG. 2. Likewise it is understood that the figure is for illustrative purposes and should not be considered limiting.

In another preferred embodiment, before the template is used, texturing may be created on the surface of the applied medium. Known methods may include stamps, texturing skins, designs, patterns, etc. It is further contemplated that such decorating techniques may be used after the template is generally utilized. It is still further contemplated that other known forms of coloring, decorating, and so forth may be achieved as known in the art.

Figure 5:
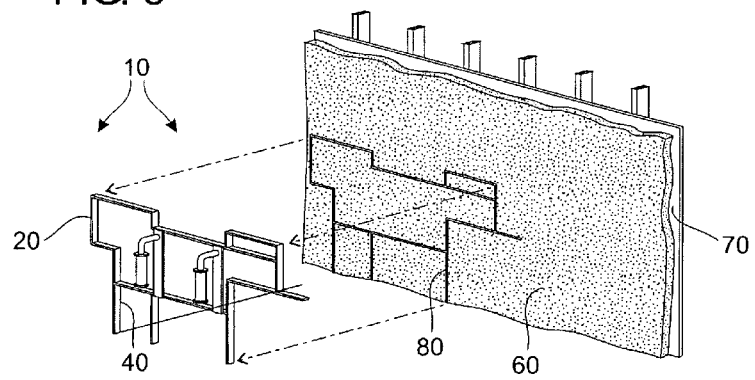
FIG. 5 is a general illustration of a preferred embodiment of the invention showing a template or stamp being removed from a medium on a vertical surface leaving a desired design, pattern or imprint.

As generally depicted in FIG. 5, tool 20 is shown making a starting, first pattern, impression, or desired decoration 80. It is to be understood that medium 60 may be shaped without a tool 20, imprint and so forth and be made into a desired decorative vertical surface.

Figure 6:
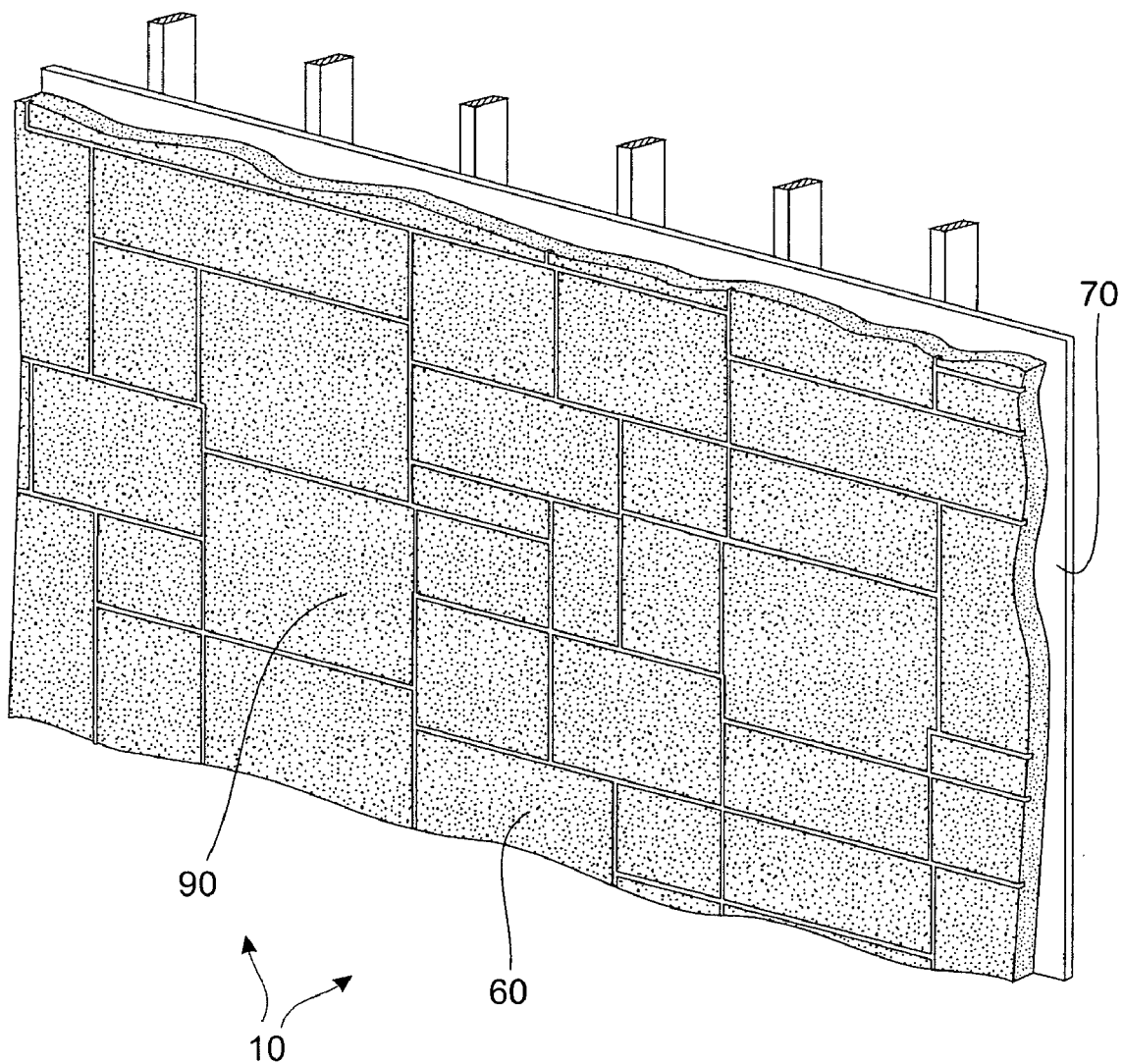
FIG. 6 is a general illustration of a preferred embodiment of the invention showing a desired design, pattern, or imprint on a vertical surface medium.

It is contemplated that addition lines may applied within the impressioned design to further create grout lines in a non repeating or repeating manner as generally depicted in FIG. 6. Other known methods may further be used to create desired patterns. Desired decorative pattern 90 as depicted in FIG. 6 should not be considered limiting and is provided as an example of a preferred embodiment.

In accordance with a preferred embodiment of the invention, a method for decorating vertical surfaces may comprise the steps of providing a medium comprised of cement, a light weight aggregate, silica sand, fused silica, monofilament fine denier fiber, liquid polymer resin, and water; applying a bond coat of a primer made from concentrated liquid polymer to said vertical surface; allowing said bond coat to become tacky; and applying said medium to said bond coat on said vertical surface. The method may further include the step of imprinting a design on said medium. Still further, the method may further include the steps of allowing said medium to set forming a scratch coat; applying a liquid release agent to said scratch coat; applying said medium over said liquid release agent; and decorating said medium on said vertical surface.

Still further, the method may include a scratch coat of about ⅛ of an inch thick, the liquid release agent is a liquid form of medium aliphatic solvent naphtha, applying said medium over said liquid release agent is applied about ½ inch thick. The method may include decorating by including imprinting designs in said medium via a tool that creates a faux tile appearance Changes may be made in the combinations, operations, and arrangements of the various parts and elements described herein without departing from the spirit and scope of the invention.

I claim:

1. A method for decorating a vertical surface comprising the steps:
    a) providing a medium comprised of cement, a light weight aggregate, silica sand, fused silica, monofilament fiber, liquid polymer resin, and water;
    b) applying a bond coat of a primer made from concentrated liquid polymer to said vertical surface;
    c) allowing said bond coat to become tacky;
    d) applying said medium to said bond coat on said vertical surface;
    e) allowing said medium to set forming a scratch coat;
    f) applying a liquid release agent to said scratch coat;
    g) applying said medium over said liquid release agent; and
    h) decorating said medium on said vertical surface.

2. The method of claim 1 wherein said scratch coat is about ⅛ of an inch thick.

3. The method of claim 1 wherein said liquid release agent is a liquid form of medium aliphatic solvent naphtha.

4. The method of claim 1 wherein applying said medium over said liquid release agent is applied about ½ inch thick.

5. The method of claim 1 wherein said decorating said medium further includes imprinting designs in said medium via a tool that creates a faux tile appearance.

\* \* \* \* \*